US009953144B2

(12) United States Patent
Rombouts et al.

(10) Patent No.: US 9,953,144 B2
(45) Date of Patent: Apr. 24, 2018

(54) CONSTELLATION BASED DEVICE BINDING

(71) Applicant: NXP B.V., Eindhoven (NL)

(72) Inventors: Peter Maria Franciscus Rombouts, Sint-Katelijne-Waver (BE); Frank Michaud, Brussels (BE); Philippe Teuwen, Louvain (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/227,681

(22) Filed: Mar. 27, 2014

(65) Prior Publication Data

US 2015/0278489 A1    Oct. 1, 2015

(51) Int. Cl.
| G06F 21/10 | (2013.01) |
| G06F 9/445 | (2018.01) |
| G06F 21/12 | (2013.01) |
| G06F 21/60 | (2013.01) |
| H04L 29/06 | (2006.01) |
| G06F 21/73 | (2013.01) |

(52) U.S. Cl.
CPC .............. G06F 21/105 (2013.01); G06F 8/61 (2013.01); G06F 9/44505 (2013.01); G06F 21/121 (2013.01); G06F 21/602 (2013.01); G06F 21/73 (2013.01); H04L 63/0876 (2013.01); *G06F 2221/0704* (2013.01); *G06F 2221/0744* (2013.01); *G06F 2221/2129* (2013.01)

(58) Field of Classification Search
CPC ...... G06F 21/105; G06F 21/73; G06F 21/602; G06F 9/44505; G06F 21/121; G06F 8/61; G06F 2221/0704; G06F 2221/2129; G06F 2221/0744; H04L 63/0876

USPC ............ 713/193, 165, 168, 181; 726/29, 30
See application file for complete search history.

(56) References Cited

U.S. PATENT DOCUMENTS

| 2005/0256864 A1* | 11/2005 | Semerdzhiev .... G06F 17/30067 |
| 2008/0208754 A1* | 8/2008 | Zunke et al. .................... 705/59 |
| 2010/0198866 A1* | 8/2010 | Stuart .......................... 707/769 |
| 2011/0144813 A1* | 6/2011 | Agahi .......................... 700/282 |

(Continued)

FOREIGN PATENT DOCUMENTS

| CN | 1530791 A | 9/2004 |
| CN | 102184180 A | 9/2011 |

(Continued)

OTHER PUBLICATIONS

Sarma, Sanjay E. et al. "RFID Systems and Security and Privacy Implications", Cryptographic Hardware and Embedded Systems, Lecture Notes in Computer Science, vol. 2523, pp. 454-469 (2002).

(Continued)

Primary Examiner — Aravind K Moorthy

(57) ABSTRACT

A method of binding a software to a device is disclosed. Accordingly, during a setup of the software in the device, a unique identifier is derived from contents stored in the device and the derived unique identifier is encrypted. The derived unique identifier is then stored in a configuration of the software. During a next invocation of the software in the device, a new unique identifier is derived from the contents stored in the device. The newly derived unique identifier is then matched with the stored unique identifier. The execution of the software is terminated if the matching fails.

19 Claims, 3 Drawing Sheets

(56) References Cited

U.S. PATENT DOCUMENTS

2014/0123255 A1* 5/2014 Etchegoyen ................. 726/7
2014/0123323 A1* 5/2014 Jung .................. H04L 41/5054
　　　　　　　　　　　　　　　　　　　　　　　726/30

FOREIGN PATENT DOCUMENTS

| CN | 103051763 A | 4/2013 |
| CN | 103368740 A | 10/2013 |
| EP | 1 469 369 A2 | 10/2004 |
| EP | 1 962 216 A2 | 8/2008 |
| WO | WO 01/84283 A2 | 11/2001 |

OTHER PUBLICATIONS

EP Communication and Partial EP Search Report dated Jul. 29, 2015 for EP Application No. 15159451.2, Jul. 29, 2015.
CN Office Action for Counterpart Patent Appln. No. 201510134105.0 (dated Jul. 18, 2017).
Extended European Search Report for Patent Appln. No. 15159451.2 (dated Dec. 23, 2015).

\* cited by examiner

CONSTELLATION BASED DEVICE BINDING

BACKGROUND

For security or licensing reasons, a particular software application may be bound to a specific device during installation or registration or first initialization process. Once the software application is bound to a particular device or user, the piece of software (e.g., the software application) may only be executed on that particular device. Once bound, the piece of software cannot be executed on another device if the piece of software is copied to another device Further, in multi-step security verification, in addition to setting up a user name and password for a Web based service, a user is required to setup security questions. When the Web based service is used for the first time via an Internet browser of a different type, the user is required to enter the answers to the security questions in order to bind the Internet browser to the Web based service. These bindings are typically stored as cookie(s) in the Internet browser. When a different browser is used or when browser cookies are deleted, the user needs to bind the Web based service to the Internet browser again. This method is prone to security breaches if user authentication information and security questions/answers are stolen.

Methods such as the use of RFID tags or device serial number, etc., may be employed to obtain a unique identification of the hardware. However, in some scenarios, such as when a software code executes in a Web browser, the software code may not have access to underlying hardware resources to obtain the identification information. Moreover, as explained by Sanjay E. Sarma, Stephen A Weis, Daniel W. Englels in "RFID Systems and Security and Privacy Implications", CHES 2002, LNCS 2523, 2003, there are privacy concerns as to use of RFID or hardware serial numbers as this information may uniquely identify a person.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

SUMMARY

Figure 1:
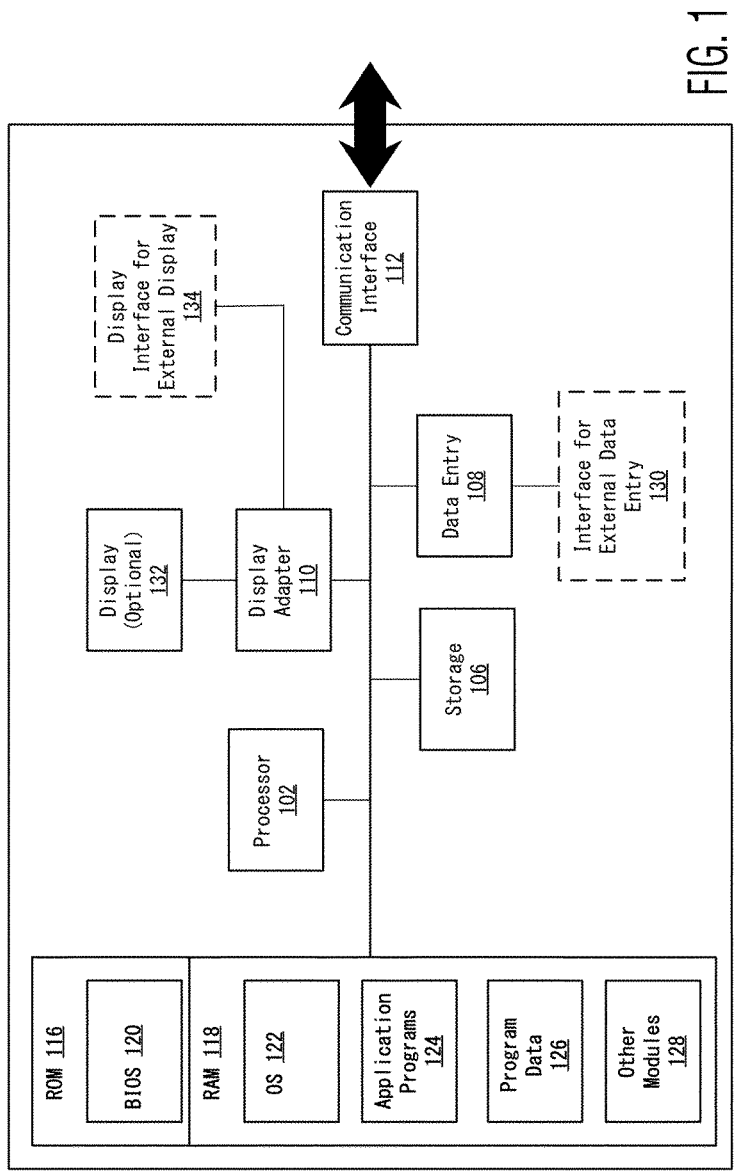
FIG. 1 is a block diagram illustrating an example hardware device in which the subject matter may be implemented.

In one example, a method of binding a software to a device is disclosed. Accordingly, during a setup of the software in the device, a unique identifier is derived from contents stored in the device and optionally, the derived unique identifier is encrypted. The unique identifier is then stored in a configuration of the software. During a next invocation of the software in the device, a new unique identifier is derived from the contents stored in the device and optionally, the new unique identifier is encrypted. The newly derived unique identifier is then matched with the stored unique identifier. The execution of the software is terminated if the matching fails. The contents stored in the device may include data stored in a selected folder. In one example, the selected folder is selected by the user of the device. In another example, the selected folder is automatically selected by the software based on a preset configuration. In yet another example, the folder may be selected via a configuration of the software. In one example, the preset configuration may include selecting one or more folders containing picture files or system configuration files or a combination thereof. The configuration may include conditions such as, only include files older than a selected date or include files of select type or types, etc. The conditions may be stored at a server.

In another example, the contents may include user selected data stored in the device. The contents include one or more of system configuration data of the device, a contact list stored in the device, photographs stored in the device, user selected data stored in the device and applications installed in the device.

In yet another example, the contents include data stored in a user selected file or a user selected folder.

In another aspect, a method of authentication of a user with a Web based service is disclosed. Accordingly, during a first access to the Web based service from a device, a unique identifier is derived from contents stored in the device. The user is authenticated using user inputted authentication data and upon successful authentication, the derived unique identifier is received by a server that hosts the Web based service. During a subsequent access to the Web based service from the device, a new unique identifier is generated from the contents stored in the device and the new unique identifier is received by the server. The server then attempts to match the new unique identifier with the previously received unique identifier. The access to the Web based service is denied if the matching fails. In one aspect, the contents used for deriving the unique identifier includes data stored in a selected folder and a data inputted by the user In yet another embodiment, a computer program product is disclosed. The computer program product includes a non-transitory computer-readable medium having a computer-readable program code embodied therein. The computer-readable program code is adapted to be executed by one or more processors to implement a method for binding a software to a device. Accordingly, when the program code is executed, a unique identifier is derived from contents stored in the device. The unique identifier may optionally be encrypted. The unique identifier (the encrypted value, if encrypted) is stored in a configuration of the software.

During a next invocation of the software in the device, a new unique identifier is derived from the contents stored in the device. The new identifier may optionally be encrypted. The new unique identifier is matched with the stored unique identifier. Execution of the software is terminated if the matching fails. In another example, some features of the software may be tied to the matching of the stored and the derived identifiers. In another example, decoding of at least some parts of the software may be performed via the derived identifier. That is, at least a part of the software are encoded via the previously stored identifier and the encoded parts are then attempted to be decoded via the derived identifier when the software executes in a device. If the identifiers do not match, the decoding will fails and consequently, at least the encoded parts will not execute in the device.

DETAILED DESCRIPTION

Binding a piece of software to a particular device without the use of information that can personally identify a person or may be used to identify a person may be beneficial to enforce licensing terms and security methods. The methods described herein do not require access to hardware information or underlying operating system core. Therefore, these methods may be implemented in platform independent manner.

Solutions are available that either use hardware hooks, hardware unique identification or operating system specific interfaces to bind a software installation to a particular device. However, these methods are either platform dependent or may cause privacy concerns. For example, in Windows™ operating system, a software application, during its installation process, may write coded information in Windows registry or in some other hidden or protected place in the file system. These methods may not be effective in some type of application software, especially the ones that are executed in a Web browser because those application software are not likely to have access to a device's underlying operating system or hardware resources as for example a script running in a Web browser. Similarly, with respect to the use of hardware information identification, the applet again will be faced with the same challenge. In addition, different types of devices may have different hardware configurations and an interface may not be available to provide the necessary information.

The subject matter presented herein provides software binding methods that do not use hardware information or operating system specific protected storage. The embodiments use a constellation of information that is typically accessible without security and privacy concerns. Accordingly, a set of identifying elements may be obtained from the device and a unique identifier can be derived from the obtained set of identifying elements. The methods described herein may be used for prevent cloning of software, protecting copy rights and licensing terms, etc.

The methods described here are advantageous because deriving a unique identifier depends only on the configuration of a device. In one or more embodiments, the unique identifier is derived from a constellation of identifying elements, which when taken alone may not be sufficient to identify the device. In some embodiments, the unique identifier may also be derived using statistical methods (e.g., a hypothesis test). In such embodiments, a pre-processing of user data may be performed. For example, the preprocessing may involve extracting facial characteristics of people present in the selected images stored in select folders in the device.

Further, the derived unique identifier may also be used to replace the HTTP cookie based machine binding mechanisms used by various Websites in conjunction with user name/password based authentications.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102. The hardware device 100 may be a desktop computer, a laptop computer, a mobile computer, a mobile phone, a tablet computer, a server system or any other type of device that is capable of executing a software program.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) may be connected to the hardware device 100 via optional external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

Optionally, a display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via optional external display interface 134. Other peripheral output devices, not shown, such as speakers and printers, may be connected to the hardware device 100. It should be noted that if the hardware device 100 is incorporated in a server farm environment, the display 132 may be coupled to the hardware device 100 remotely.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that several of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more modules for deriving a unique identifier for the computer system 100 based on a constellation of elements or statistical methods.

Even though the present disclosure is described for deriving a unique identifier from a device based on a constellation of elements or statistical method, the derivation of the unique identifier as described herein is exemplary. It should be noted that some aspects of the present disclosures may be employed for anti-cloning and content or software copyright protection, without diverting from the core concepts described herein.

The identifying elements may consist of any type of data present in a device. For example, music files, list of applets installed in the device, list of software installed in the device, specific system configurations, virtual machine data, sizes of data elements, contents of selected data files, photos, contact list, phone directory stored in the device and so on, may be used to derive a unique identifier.

In one example, the user may identify a particular folder or a group of folders for calculating an identifier based on the contents of these selected folders (or just one folder if user so desires). Typically, the user will select a folder or folders that contain rather static data, that is, the contents of these folders do not change substantially over time. For example, a folder or a group of folders that contain pictures from relating to a particular event (e.g., marriage photograph folders) in the past is not likely to change overtime. A stable unique identifier may be generated based on the contents of such static folders. In one example, at least one more different type of data may be used in combination with the contents of the selected folder or folders to generate a unique identifier. In one example, instead of using the data content of files in selected folders, file properties may be used for deriving the unique identifier. In yet another example, biometric techniques may be used to capture information from the faces and objects in the images in selected folders to derive the unique identifier.

It should be noted that other type of files such as video, music, books, documents, spreadsheets, etc. may be used for deriving the unique identifier. Virtually any type of file stored in a device may be used for deriving the unique identifier. In some examples, the user of the device may select on or more types of files to be used for deriving the unique identifier. In other examples, an application configuration or a Web server that hosts a Web application to be executed by the device may select the type file or files to be used for deriving the unique identifier.

In one example, the constellation of data that is used for deriving a unique identifier may change over time. However, in one example, a value range can be configure and if the unique identifier is within the preconfigured value range, the identifier matching mechanism will indicate a match even though the identifiers being matched are not identical. In another example, file properties are hashed separately and more than one hashes for each file in the constellation that is selected to be used for deriving an identifier or for providing authorization/authentication services, are maintained. In other words, file date and size may be hashed separate from the file content.

In one example, where the newly derived identifier is within a pre-defined deviation range of the previously derived unique identifier, the previously derived unique identifier, that is stored in a configuration, is replaced by the newly derived unique identifier.

In another example, image hashing may be used. Image hashing is calculated based on features of an image. Hence, if there are two identical images in different file formats having different bit contents (due to different types of compressions), the derived hash value will be either identical or substantially identical.

In yet another example, image hashing techniques in which characteristics or features are extracted from file contents such that even if the file contents is slightly altered, a number of the characteristics can still be extracted and a match can be determined between the previously recorded characteristics and the measured characteristics. After a positive match either based on absolute value match or derived value falling within a predefined range, the newly extracted characteristics can replace the previously recorded characteristics such that a future comparison will be done against the latest validated characteristics. Typically, feature extraction from an image or media file involves simplifying the amount of resources required to describe a large set of data accurately. The input data is transformed into a reduced representation set of features (also named features vector). Transforming the input data into the set of features is called feature extraction.

Furthermore, in one example, the user may use cloud based data backup services to synchronize such folders among all devices exclusively used by the user. Such synchronization of these folders will allow the user to automatically bind all devices exclusively used by the user to the software that requires device-software bindings. In addition, the user can then conveniently use all his/her devices to access Web based services that require device-service bindings without any need to have separate security questions and answers. In some example, the Web based service may not even require the user to input a user name or password for accessing the Web based service from his/her devices that have the folder or folders that were initially used to bind the Web based service to the user.

In one example, software scripts executing in a Web browser or programming instructions executing in the device operating system may be used to generate a unique identifier to be used for the device binding. The unique identifier may be generated using one of many methods such as calculating a hash of the contents of selected folders and/or other type of user selected data stored in the device in question. In another example the file names of the files stored in the selected folder(s) may be used for creating a hash value. A person skilled in the art would appreciate that other techniques may be employed to derive a unique identifier based on the user selected data stored in the device.

One way of deriving a unique identifier is to calculate MD5/SHA1/CRC21/SHA256 hashes of one or more selected files. In one example, a configuration is maintained based either a user selection or based on a preset selection criteria in a unique identifier generation script or program. For example, a user may configure the unique identifier generation script to use certain type of files in one or more folders (e.g., jpg and/or png files stored in folder1 or folder1 & folder 2). In another example, a Web based service or a software that needs to be bound to a particular device may preconfigure the unique identifier generation script or program to use a particular type of data in the device to calculate the hashes. For example, contents of a folder, selected registry values, selected information in user profile stored in the device, etc. may be used to calculate the hashes. It should be noted that the above examples are provided merely for an easy understanding of the present disclosure. A person skilled in the art would realize that there could be many other types of data or content stored in the device may be used for generating a unique identifier. In one example, a user may also provide a data that is not stored in the device for generation of a unique identifier. This user provided data may be used in conjunction with selected data stored in the device to derive a unique identifier.

Typically, a hash of a file content or a string is a unique word as for example, the following hashes are derived from an input string "CONSTELLATION BASED DEVICE BINDING."

MD5 Hash: 3EC0D77DB85282C34DB4AE6C2E9F4CBA
SHA1 Hash: 0A925B68DFCA13A9A32E8D040E77CAO2DBC9C17D
SHA-256 Hash: 01B09BF74B7F8A6A615F4C7FF81E61-93D9CD05981947A78D05C31648217C216D Typically, the size of the hash value remains the same irrespective of the size of the file content or input string.

Figure 2:
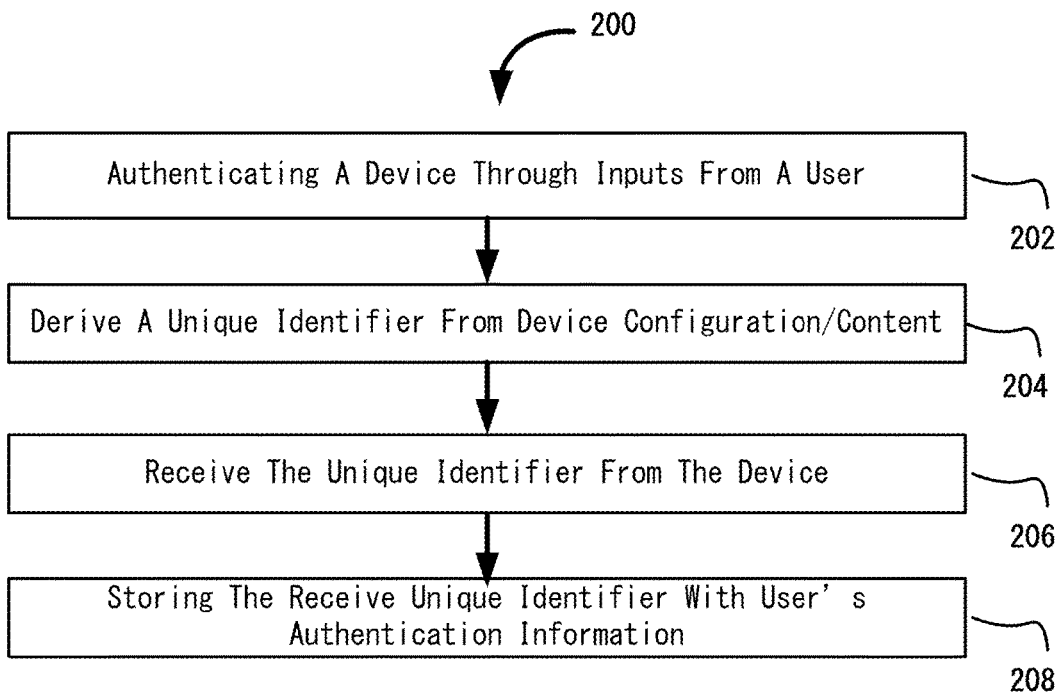
FIG. 2 illustrates an exemplary flow chart of deriving a unique identifier from the contents of a device.

FIG. 2 illustrates an exemplary flow chart 200 of deriving a unique identifier from the contents of a device. Accordingly, at step 202, a device is authenticated using authentication data inputted by a user. In one example, the authentication data may include user name and password. Other types of well-known authentication mechanism may also be employed. At step 204, a unique identifier is derived from the selected contents stored in the device. The selected contents may be data stored in folders (e.g., pictures, text) as well as information contained in user configuration files in the device. It is well known that a login profile is typically maintained in devices for users who login to the device. The unique identifier may be derived using many mechanisms such as data compression, calculating hash values, etc. In one example, the process of deriving the unique identifier is triggered by the Web-based service via invocation of a locally stored (in the device) utility program or via browser based scripts that are downloaded from the server that hosts the Web based service. At steps 206 and 208 respectively, the unique identifier is received from the device and is stored with the user authentication information at the server that hosts the Web based service.

In one example, the process 200 is performed only once. However, a user may manually trigger the execution of the process 200 to replace the previously stored unique identifier at the server.

Figure 3:
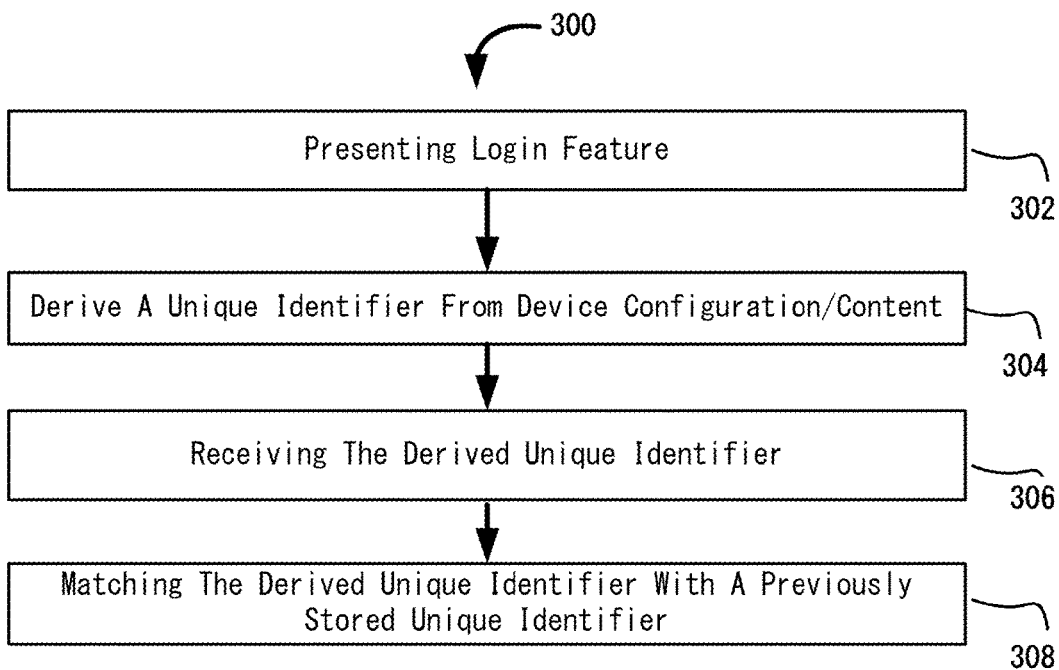
FIG. 3 illustrates an exemplary flow chart of authenticating a user of a service using a unique identifier derived from the contents of a device.

FIG. 3 illustrates an exemplary flow chart 300 of authenticating a user of a service using a unique identifier derived from the contents of a device. Accordingly, at step 302, when the user attempts to access the Web based service, the Web based service presents a login feature to the user in a Web browser. If the user proceeds with the login to the Web based service, at step 304, the Web based service causes a unique identifier to be derived from the device contents or user/device configuration using a preselected contents. At step 306, the Web based service receives the derived unique identifier from the device and at step 308, the Web based service attempts to match the received unique identifier with the previously stored unique identifier in the user authentication information. If there is a match, the access to the Web based service is granted.

Figure 4:
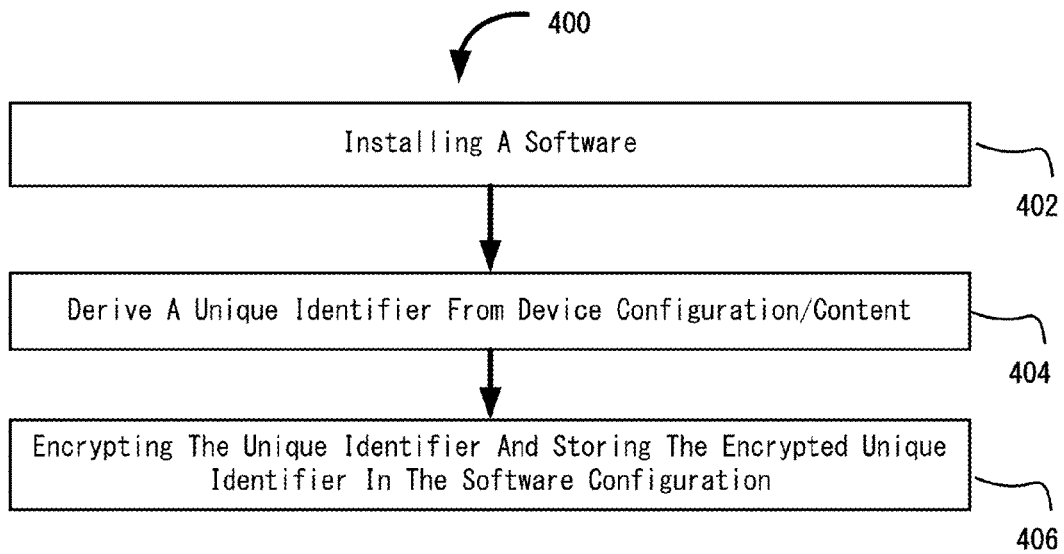
FIG. 4 illustrates an exemplary flow chart of binding a software to a device using a unique identifier derived from the contents of a device.

FIG. 4 illustrates an exemplary flow chart of binding a software to a device using a unique identifier derived from the contents of a device. Accordingly, at step 402, the installation or setup of the software is initiated on the device. At step 404, a unique identifier is derived from the selected contents stored in the device. The selected contents may be data stored in folders (e.g., pictures, text) as well as information contained in user configuration files in the device. It is well known that a login profile is typically maintained in devices for users who login to the device. The unique identifier may be derived using many mechanisms such as data compression, calculating hash values, etc. At step 406, the unique identifier is stored in the software configuration securely in a temper proof manner. In one example, the unique identifier may be encrypted prior to the storing.

Figure 5:
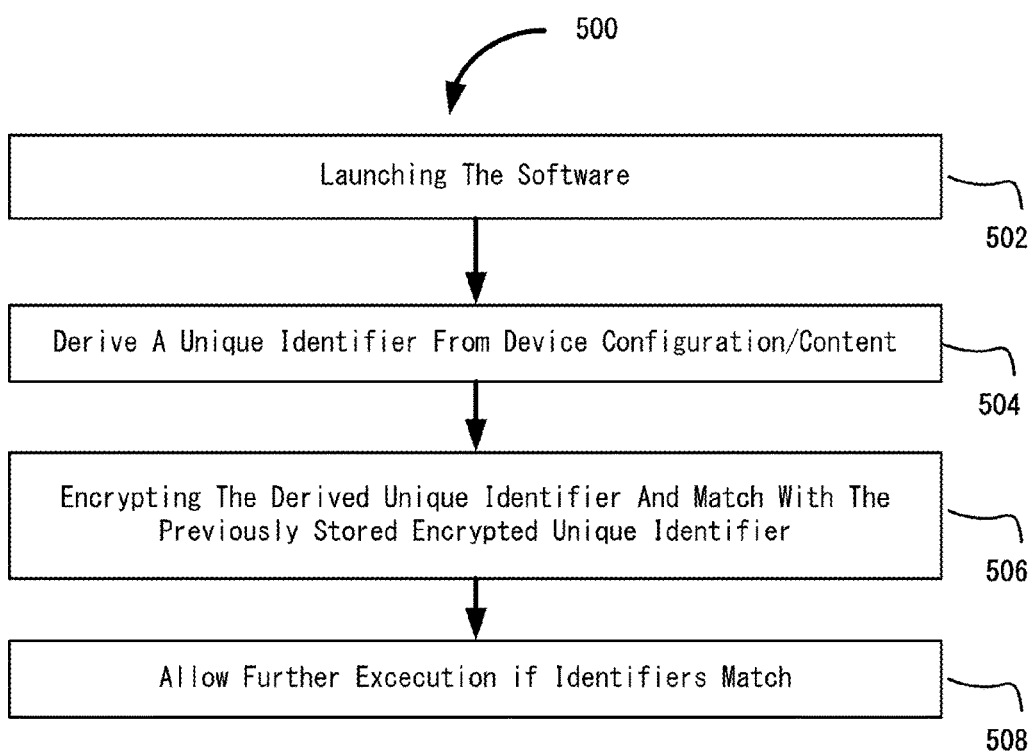
FIG. 5 illustrates an exemplary flow chart of authorizing a software.

FIG. 5 illustrates an exemplary flow chart 500 for authorizing the software. Accordingly, at step 502, the execution of the software is initiated in the device. At step 504, a unique identifier is derived from the selected contents stored in the device. The selected contents may be data stored in folders (e.g., pictures, text) as well as information contained in user configuration files in the device. It is well known that a login profile is typically maintained in devices for users who login to the device. The unique identifier may be derived using many mechanisms such as data compression, calculating hash values, etc. At step 506, the newly derived unique identifier is matched with the unique identifier stored in the software configuration. The newly derived unique identifier may be encrypted prior to the matching. At step 508, further execution of the software is allowed if the two identifiers match. Otherwise, the execution of the software is terminated. In one example, a message may be displayed on the display of the device to indicate that the software is not authorized to run on the device.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method of binding software to a device, the method comprising, during a setup of the software in the device:
deriving a unique identifier from data compressing or hashing contents of selected folders stored in the device, wherein the contents comprise a constellation of identifying elements, which when taken alone are insufficient to identify the device;
storing the unique identifier in a configuration of the software; and
during a next invocation of the software in the device:
deriving a new unique identifier from data compressing or hashing identical contents stored in the device; and
matching the new unique identifier with the stored unique identifier, wherein the matching results in an affirmative response when the new unique identifier is within a pre-defined deviation range of the stored unique identifier.

2. The method of claim 1, wherein the unique identifier is encrypted prior to the storing.

3. The method of claim 1, wherein an execution of the software is terminated if the matching fails.

4. The method of claim 1, wherein the contents include at least one of data stored in a selected folder and user selected data stored in the device.

5. The method of claim 1, wherein, if the new unique identifier does not exactly match with the stored unique identifier but the new unique identifier is within the pre-defined deviation range, further comprising:
replacing the stored unique identifier by the new unique identifier in the configuration of the software.

6. The method of claim 1, wherein the contents include one or more of system configuration data of the device, a contact list stored in the device, photographs stored in the device, user selected data stored in the device, and applications installed in the device.

7. A method of authentication of a user with a Web based service, the method comprising:
during a first access to the Web based service from a device, causing a unique identifier to be derived from data compressing or hashing contents of selected folders stored in the device, wherein the contents comprise a constellation of identifying elements, which when taken alone are insufficient to identify the device;
authenticating the user using user inputted authentication data;
upon successful authentication, receiving the derived unique identifier at a server that hosts the Web based service;
during a subsequent access to the Web based service from the device, causing a new unique identifier to be derived from data compressing or hashing identical contents stored in the device and receiving the new unique identifier at the server; and
matching the new unique identifier with the previously sent unique identifier, wherein the matching results in an affirmative response when the new unique identifier is within a pre-defined deviation range of the stored unique identifier.

8. The method of claim 7, wherein the contents includes data stored in a selected folder and data inputted by the user.

9. The method of claim 8, wherein the access is denied if the matching fails.

10. The method of claim 7, wherein the contents include data stored in a folder.

11. The method of claim 7, wherein the contents include user selected data stored in the device.

12. The method of claim 7, wherein the contents include one or more of system configuration data of the device, a contact list stored in the device, photographs stored in the device, user selected data stored in the device, and applications installed in the device.

13. The method of claim 7, wherein the contents include data stored in a user selected file or a user selected folder.

14. A computer program product, comprising a non-transitory computer-readable medium having a computer-readable program code embodied therein, the computer-readable program code adapted to be executed by one or more processors to implement a method for binding a software to a device, the method comprising:
during a setup of the software in the device: deriving a unique identifier from data compressing or hashing contents of selected folders stored in the device, wherein the contents comprise a constellation of identifying elements, which when taken alone are insufficient to identify the device; storing the unique identifier in a configuration of the software;
during a next invocation of the software in the device: deriving a new unique identifier from data compressing or hashing identical contents stored in the device; and matching the new encrypted unique identifier with the stored encrypted unique identifier, wherein the matching results in an affirmative response when the new unique identifier is within a pre-defined deviation range of the stored unique identifier.

15. The non-transitory computer-readable medium of claim 14, wherein the unique identifier is encrypted prior to the storing.

16. The non-transitory computer-readable medium of claim 15, wherein an execution of the software is terminated if the matching fails.

17. The non-transitory computer-readable medium of claim 14, wherein the contents include data stored in a folder.

18. The non-transitory computer-readable medium of claim 14, wherein the contents include user selected data stored in the device.

19. The non-transitory computer-readable medium of claim 14, wherein the contents include one or more of system configuration data of the device, a contact list stored in the device, photographs stored in the device, user selected data stored in the device, and applications installed in the device.

* * * * *